(12) United States Patent
Wittrock et al.

(10) Patent No.: US 10,044,133 B2
(45) Date of Patent: Aug. 7, 2018

(54) ELECTRICAL PLUG TYPE CONNECTOR AND PLUG TYPE CONNECTOR SYSTEM FOR AN ELECTRIC OR HYBRID VEHICLE

(71) Applicant: TE Connectivity Germany GmbH, Bensheim (DE)

(72) Inventors: Frank Wittrock, Schriesheim (DE); Dirk Weyrauch, Lorsch (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 14/990,177

(22) Filed: Jan. 7, 2016

(65) Prior Publication Data

US 2016/0118744 A1     Apr. 28, 2016

Related U.S. Application Data

(63) Continuation of application No. PCT/EP2014/064432, filed on Jul. 7, 2014.

(30) Foreign Application Priority Data

Jul. 8, 2013   (DE) .................. 10 2013 213 336

(51) Int. Cl.
   *H01R 13/52*     (2006.01)
   *H01R 13/436*    (2006.01)
   *B60L 11/18*     (2006.01)

(52) U.S. Cl.
   CPC ...... *H01R 13/5227* (2013.01); *B60L 11/1818* (2013.01); *H01R 13/4367* (2013.01); *H01R 2201/26* (2013.01)

(58) Field of Classification Search
   CPC ............ B60L 11/1818; H01R 13/5227; H01R 13/4367
   USPC ................... 439/871, 872, 744, 205
   See application file for complete search history.

(56) References Cited

U.S. PATENT DOCUMENTS

| 3,922,477 | A | * | 11/1975 | Glowacz | H01R 13/746 174/18 |
| 5,066,252 | A |   | 11/1991 | Kato et al. | |
| 5,816,643 | A | * | 10/1998 | Itou | B60L 11/1846 296/97.22 |

(Continued)

FOREIGN PATENT DOCUMENTS

| EP | 2365589 A1 | 9/2011 |
| EP | 2525443 A1 | 11/2012 |

(Continued)

OTHER PUBLICATIONS

Machine translation of EP 2573880 A1 ("Hornung").*

(Continued)

*Primary Examiner* — Renee Luebke
*Assistant Examiner* — Paul Baillargeon
(74) *Attorney, Agent, or Firm* — Barley Snyder (57) ABSTRACT

An electrical plug type connector is disclosed. The electrical plug type connector has an electrically insulating housing, a plurality of first contact chambers disposed in the housing, a plurality of power contact elements which are each received in one of the plurality of first contact chambers, and a plurality of separate drainage channels integrally formed in the housing. Each drainage channel is fluidly connected to one of the plurality of first contact chambers.

15 Claims, 12 Drawing Sheets

(56) References Cited

U.S. PATENT DOCUMENTS

| | | | |
|---|---|---|---|
| 6,247,965 B1* | 6/2001 | Cummings | H01R 13/4223 439/148 |
| 8,257,101 B2 | 9/2012 | Toshifumi | |
| 8,317,534 B2* | 11/2012 | Osawa | B60L 11/1818 439/353 |
| 8,597,039 B2 | 12/2013 | Osawa | |
| 8,827,731 B2 | 9/2014 | Sasaki et al. | |
| 2002/0081486 A1* | 6/2002 | Williams | B60L 11/1818 429/100 |
| 2013/0078846 A1* | 3/2013 | Sasaki | B60L 11/1818 439/374 |

FOREIGN PATENT DOCUMENTS

| | | |
|---|---|---|
| EP | 2573880 A1 | 3/2013 |
| WO | 2012146766 A1 | 11/2012 |
| WO | 2012169144 A1 | 12/2012 |

OTHER PUBLICATIONS

Abstract of EP 2573880, dated Mar. 27, 2013, 1 page.
PCT International Search Report and Written Opinion of the International Searching Authority, Application No. PCT/EP2014/064432, dated Sep. 3, 2014, 11 pages.
Results of earlier search, dated Mar. 19, 2014, 10 pages.
Chinese First Office Action, dated Dec. 30, 2016, 9 pages.
EPO Office Action, dated May 31, 2017, 5 pages.
Chinese office action cited in co-pending application No. 201480038916.4 and English translation, 7 pages dated Mar. 28, 2018.

* cited by examiner

ELECTRICAL PLUG TYPE CONNECTOR AND PLUG TYPE CONNECTOR SYSTEM FOR AN ELECTRIC OR HYBRID VEHICLE

CROSS-REFERENCE TO RELATED APPLICATIONS

This application is a continuation of International Application No. PCT/EP2014/064432, filed Jul. 7, 2014, which claims priority under 35 U.S.C. § 119 to German Application No. 102013213336.7, filed Jul. 8, 2013.

FIELD OF THE INVENTION

The present invention relates to an electrical plug type connector, and more particularly, to an electrical plug type connector for a charging socket of an electric or hybrid vehicle.

BACKGROUND

In electric or hybrid vehicles, various battery charging systems operate with comparatively high voltages and currents (for example, 400 Volt alternating current at 50 or 60 Hz) in order to keep the charging times as short as possible. These high voltages involve strict safety requirements with respect to the contact safety, breakdown strength, and the creep currents which occur. According to requirement IEC 62196-1, for example, the sizing of the creep paths is intended to be configured particularly in accordance with a pollution degree 4 according to IEC 60664-1.

The charging socket of a motor vehicle can come into contact with moisture, which in the case of winter use or coastal climates, may be salt water. Since contact with water spray and moisture cannot be avoided entirely, means must further be provided in order to discharge water which has entered the charging socket. It is known to fit drains which direct water via a corresponding drainage path out of the plug type connector region.

Such drainage openings in the contact chambers and inside the plug type collar further have the advantage that, when the plug type connection is assembled and released, an exchange of air can take place, so that the insertion forces remain as small as possible. Examples of such drainage arrangements are described in U.S. Pat. No. 8,257,101 B2 and EP 2525443 A1.

Further, U.S. Pat. No. 5,066,252 A discloses a receiving member for metal contacts which is intended to prevent unintentional securing of the contact receiving member in a plug type connector by means of the provision of a two-step locking process. WO 2012/169144 A1 makes reference to a sealed plug type connector for contacting a motor-vehicle-side mating connector having a lock for fixing the plug type connector in the inserted state. However, in these known arrangements, the drainage openings of the contact chambers open in common drainage channels and are further formed by means of a cooperation of sealing elements and housing walls. The known arrangements are not suitable for complying with the requirements with respect to the long creep paths, such as the aforementioned pollution degree 4 of IEC 60664-1.

SUMMARY

An object of the invention, among others, is to provide an electrical plug type connector which operates under harsh conditions according to the appropriate safety requirements. The disclosed electrical plug type connector has an electrically insulating housing, a plurality of first contact chambers disposed in the housing, a plurality of power contact elements which are each received in one of the plurality of first contact chambers, and a plurality of separate drainage channels integrally formed in the housing. Each drainage channel is fluidly connected to one of the plurality of first contact chambers.

BRIEF DESCRIPTION OF THE DRAWINGS

The invention will now be described by way of example with reference to the accompanying figures, of which.

DETAILED DESCRIPTION OF THE EMBODIMENT(S)

The invention is explained in greater detail below with reference to embodiments of a charging socket. This invention may, however, be embodied in many different forms and should not be construed as limited to the embodiments set forth herein; rather, these embodiments are provided so that this disclosure will be thorough and complete and still fully convey the scope of the invention to those skilled in the art. The described embodiment is an AC charging socket in accordance with a GB/Chinese standard. In this standard, five power contact elements and two signal contacts are provided. However, the principles according to the invention may of course also be used with all other alternating current, direct current or combined AC/DC charging systems.

Figure 1:
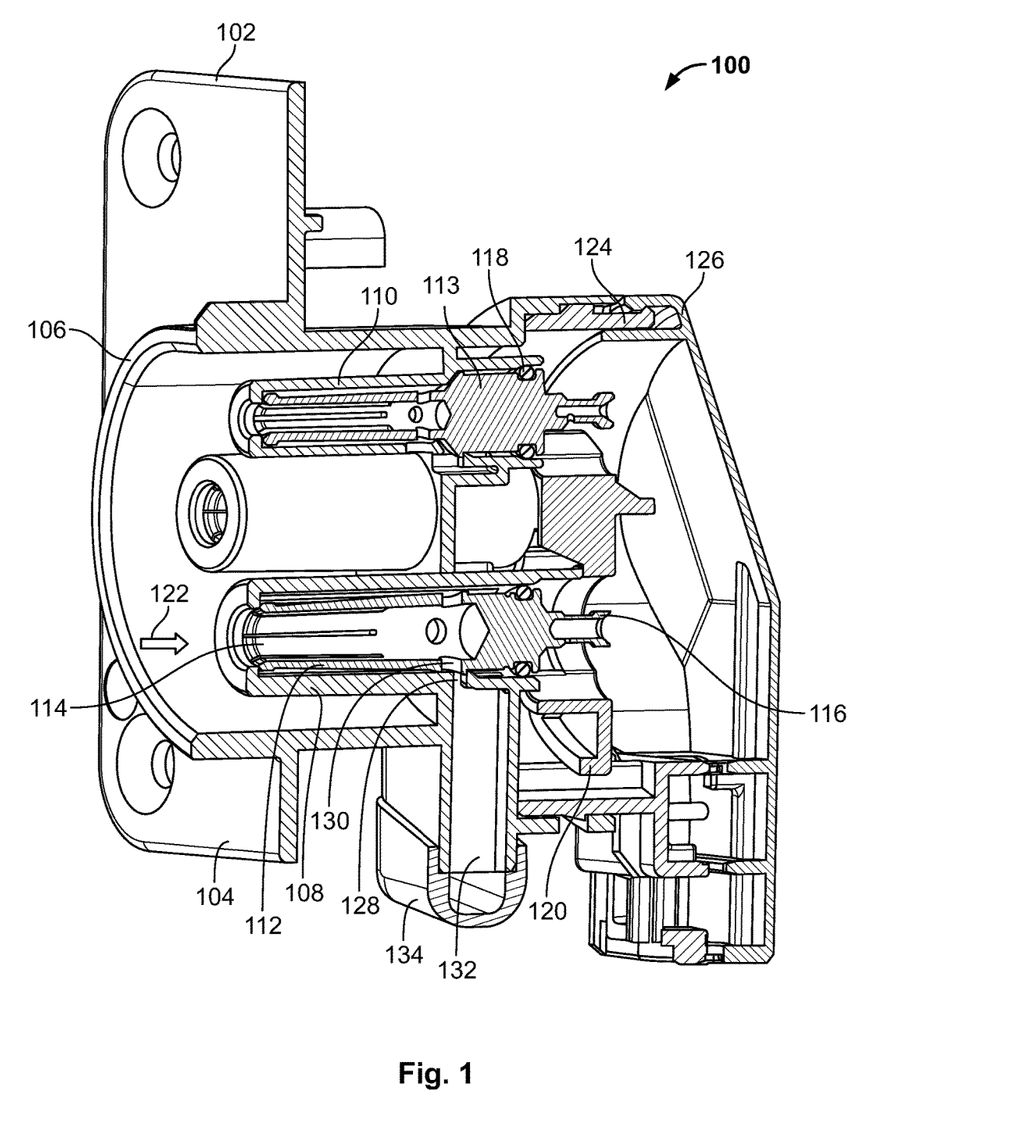
FIG. 1 is a perspective sectional view of an electrical plug type connector according to the invention.
Figure 2:
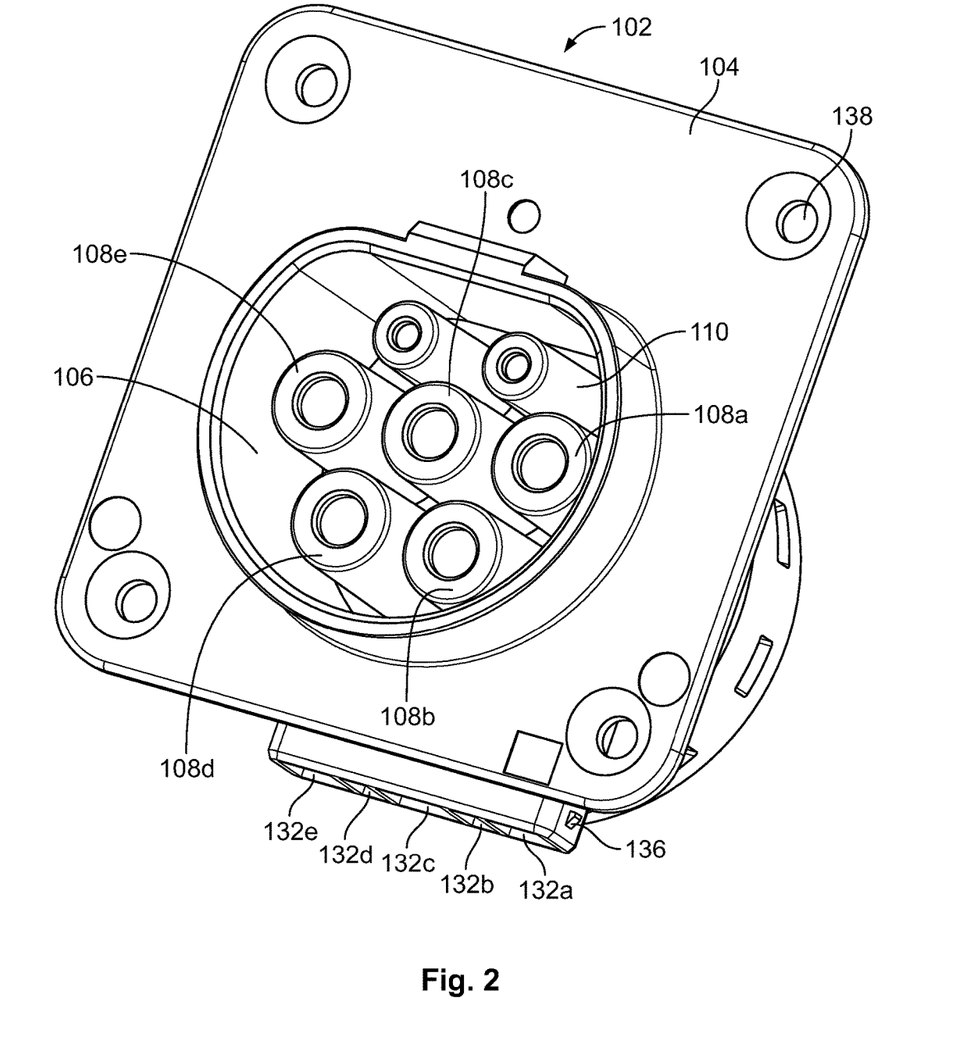
FIG. 2 is a perspective view of a housing of the electrical plug type connector.

The charging socket 100 of the present invention is shown generally in FIGS. 1 and 2. The charging socket 100 includes a housing 102, power contact chambers 108, signal contact chambers 110, a locking device 120, and drainage channels 132. The major components of the invention will now be described in greater detail.

The housing 102 can be produced from an electrically insulating plastics material using injection-moulding technology. The housing 102 has an assembly plate 104, from which an insertion socket 106 partially protrudes. In the assembly plate 104, there are further provided securing openings 138, through which the charging socket 100 can be connected to a vehicle chassis by means of riveting or screwing.

Contact chambers 108 for the power contact elements and contact chambers 110 for the signal contacts are arranged inside the collar-like insertion socket 106. In an embodiment shown in FIGS. 1 and 2, according to the GB/China Standard Part 2, the charging socket 100 has five power contact chambers 108a-e and two signal contact chambers 110.

Each of the power contact chambers 108 has a drainage opening 128. The drainage opening 128 is fluidly connected to a drainage channel 132, as shown in FIG. 1, which is produced from the housing material. The drainage channel 132 is closed at all sides in the cross-section thereof and separate channels 132a-e, with separate drainage openings 128a-e, for each contact chamber 108 are integrally formed as shown in FIG. 2. Each of the drainage channels 132, which extend in a substantially parallel manner, is fluidly connected to a discharge connection piece 134. A catch projection 136 may be formed on the exterior of the drainage channels 132, as shown in FIG. 2.

Electrically conductive power contact elements 112 which are generally produced from metal are received in each case in the power contact chambers 108. For reliable sealing between the housing 102 and the power contact elements 112, O-rings 118 may be fitted as a sealing means therebetween.

Figure 5:
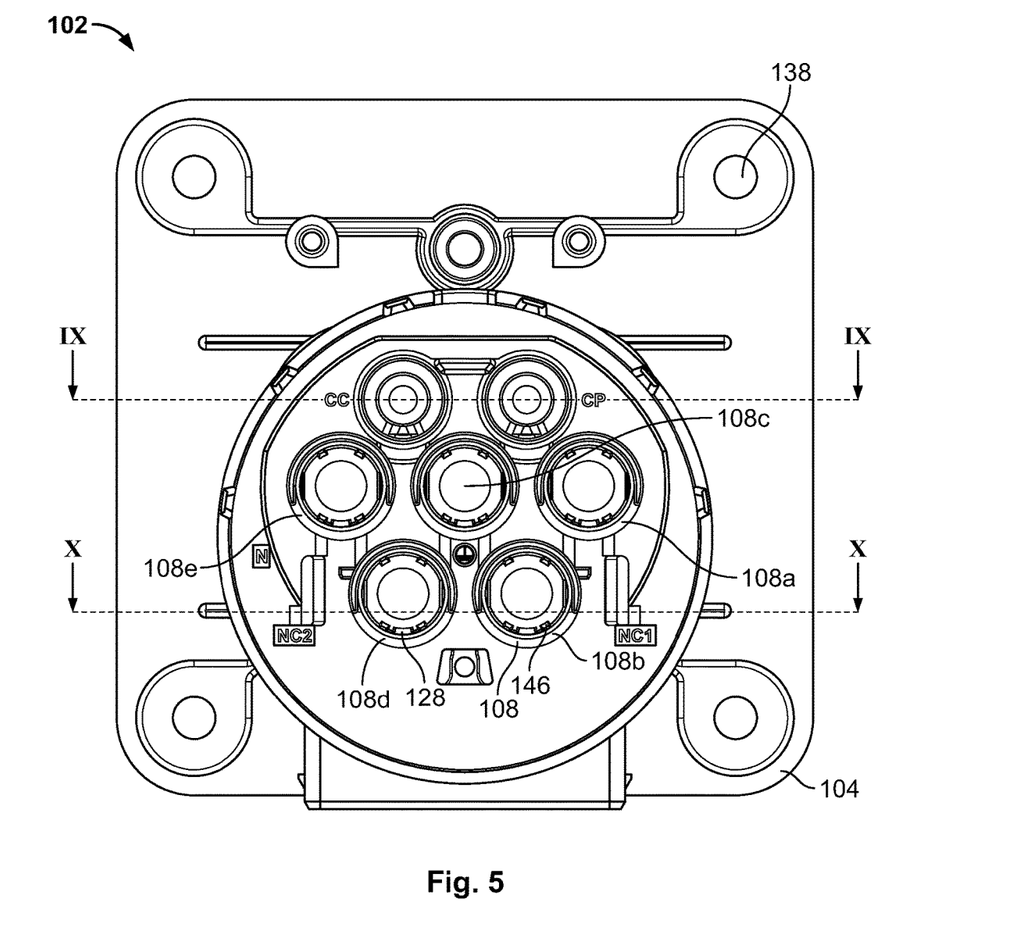
FIG. 5 is a plan view of the housing of FIG. 2.
Figure 8:
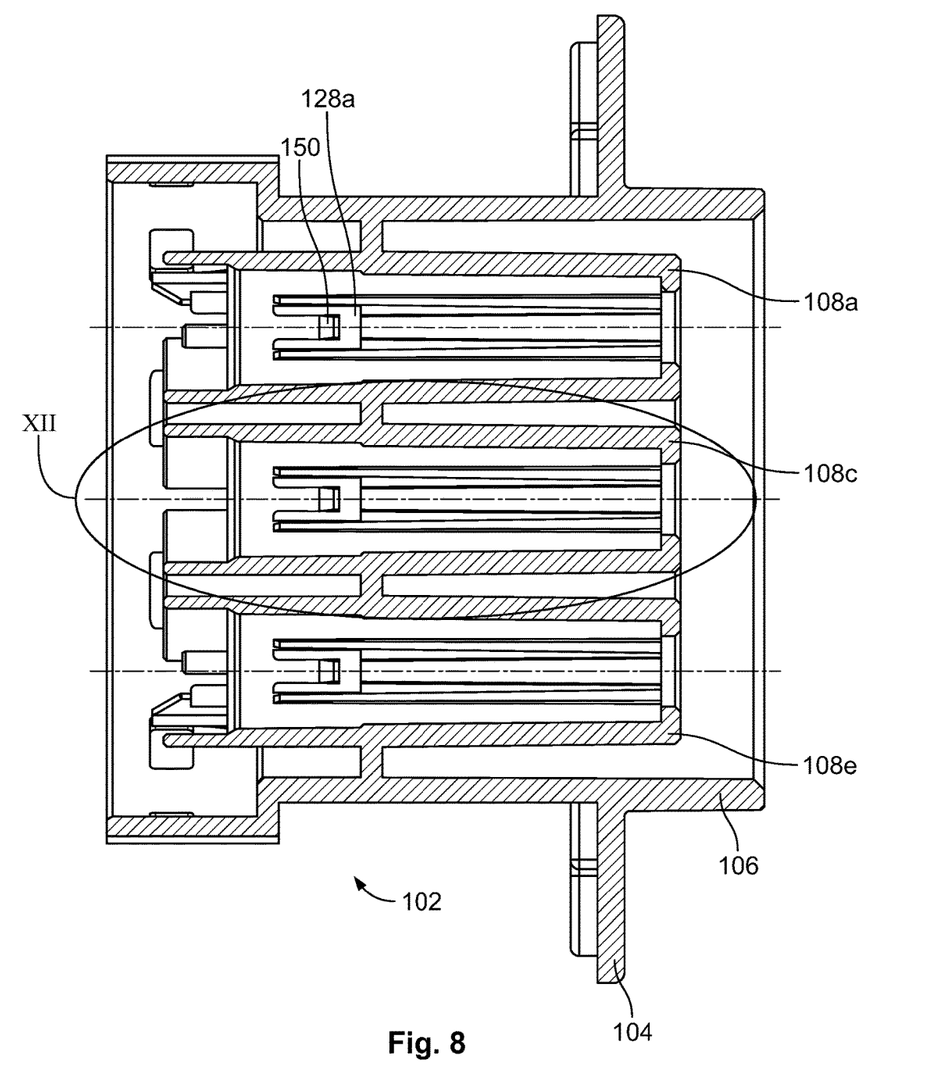
FIG. 8 is a sectional view taken along line VIII-VIII of FIG. 4.
Figure 12:
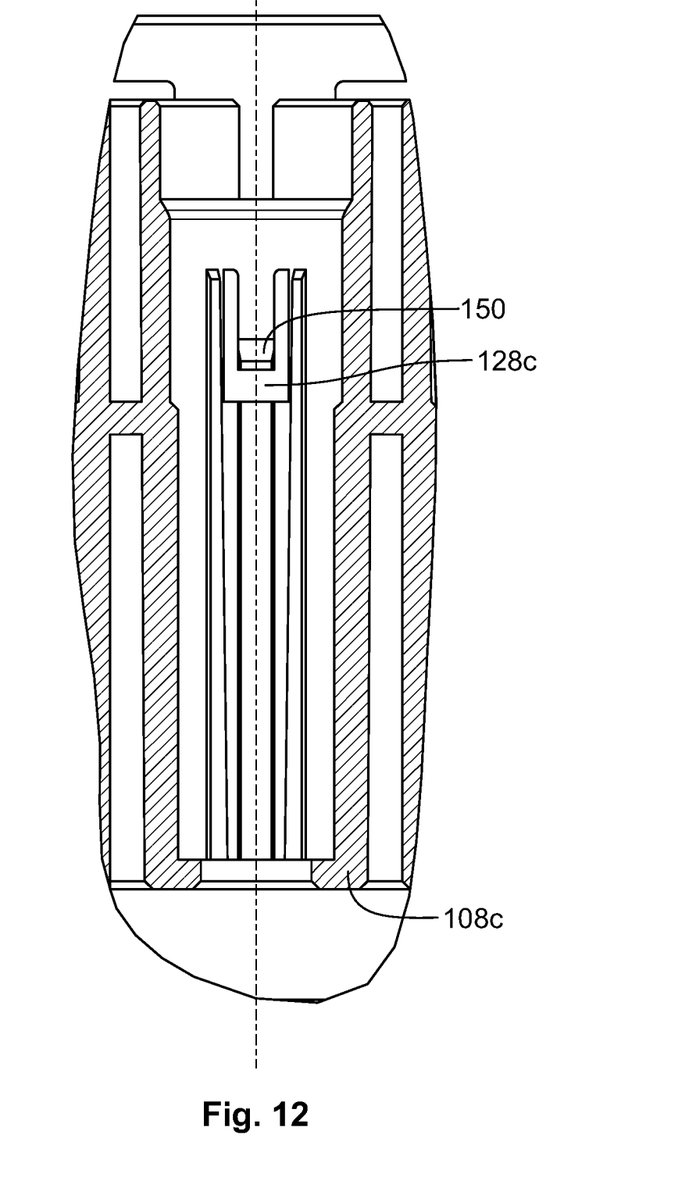
FIG. 12 is a detail view of region XII of FIG. 8.

The power contact elements 112 may be secured in the associated power contact chambers 108 by a catch arm 150 in the drainage opening 128, shown in FIGS. 8 and 12. The power contact elements 112 may also be retained by compressing ribs 146 as shown in FIG. 5. Alternatively, a locking device 120 may be displaced transversely relative to the insertion direction 122 in order to lock all contact elements 112 in one operating step.

In the embodiment shown, the power contact elements 112 are constructed as socket contacts, however, the present invention is not limited only to socket contacts; pin contacts can naturally also be used for a plug type connector 100 according to the invention. Each of the power contact elements 112 has a contact region 114 in which the electrical contact is mated with a mating connector and a connection region 116 in which the lines which lead to the vehicle cabling and consequently to the vehicle electrical system are connected. In the embodiment shown, the connection region 116 is constructed as a socket contact, in the same manner as the contact region 114. The metal contact element 112, as shown in FIG. 1, has an opening 130 that aligns with the drainage opening 128.

Figure 4:
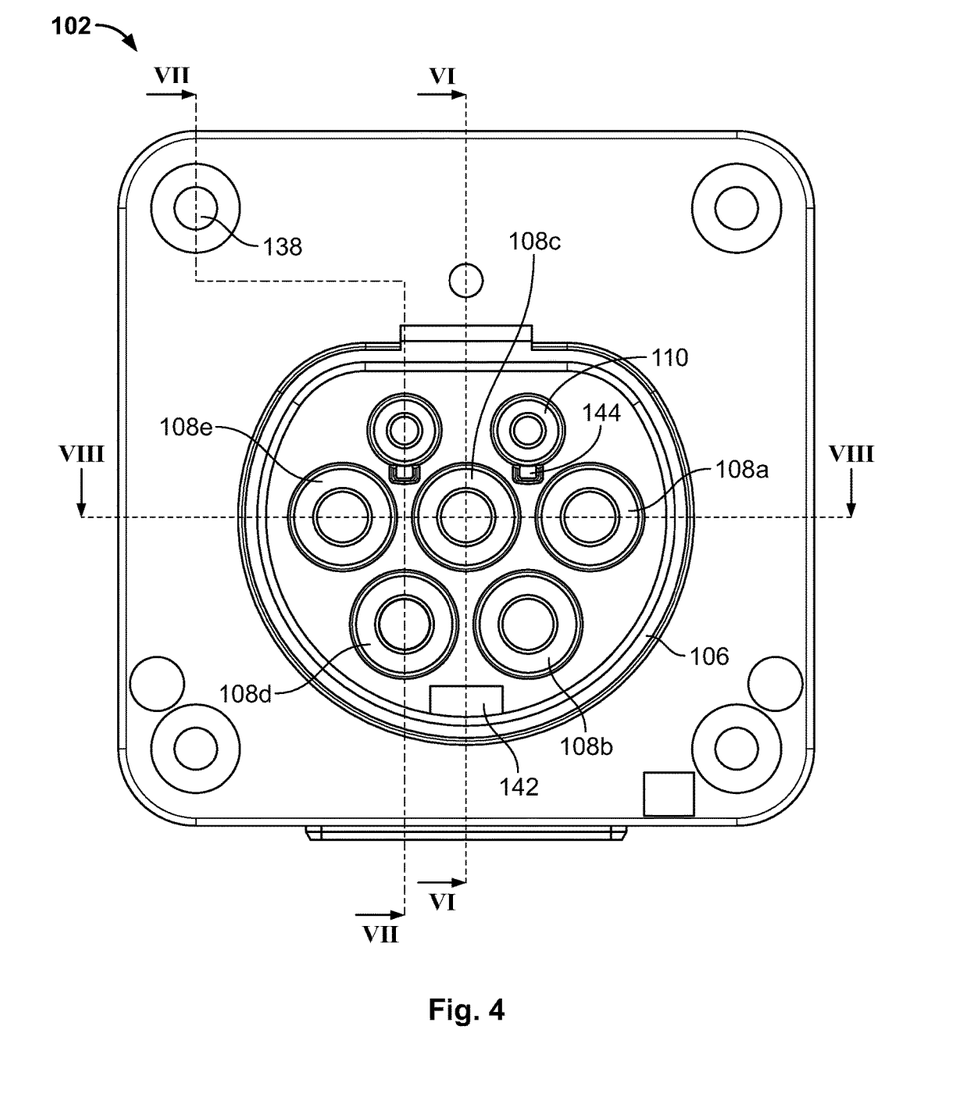
FIG. 4 is a plan view of the housing of FIG. 2.
Figure 7:
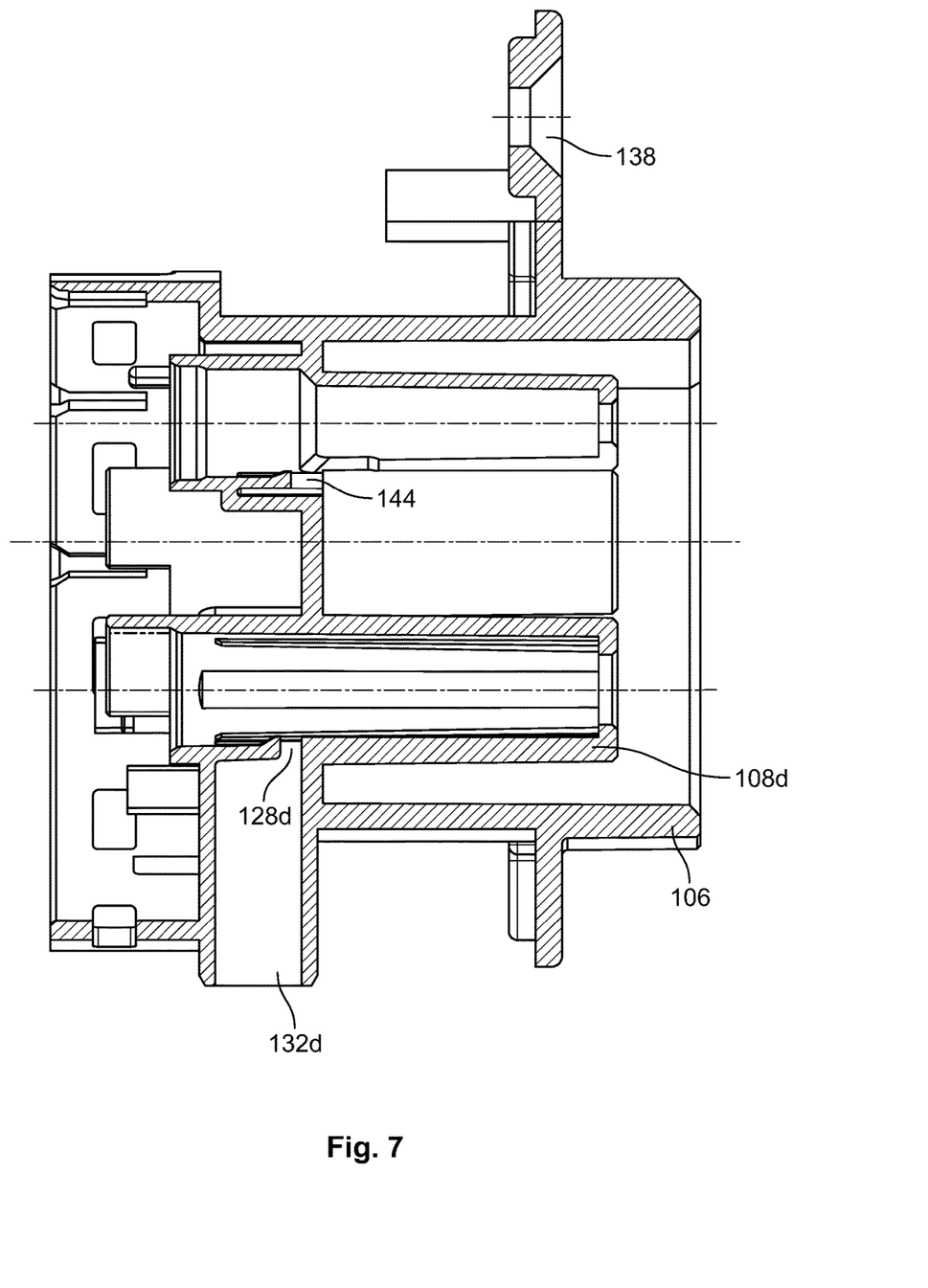
FIG. 7 is a sectional view taken along line VII-VII of FIG. 4.
Figure 9:
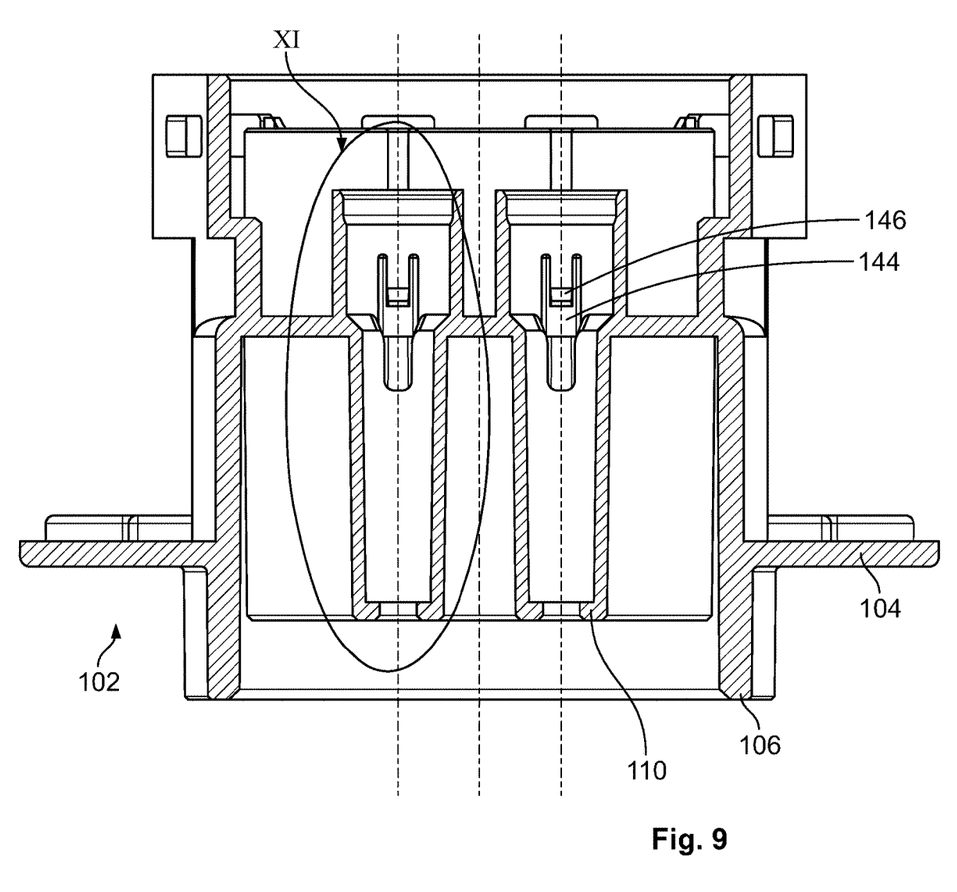
FIG. 9 is a sectional view taken along line IX-IX of FIG. 5.
Figure 10:
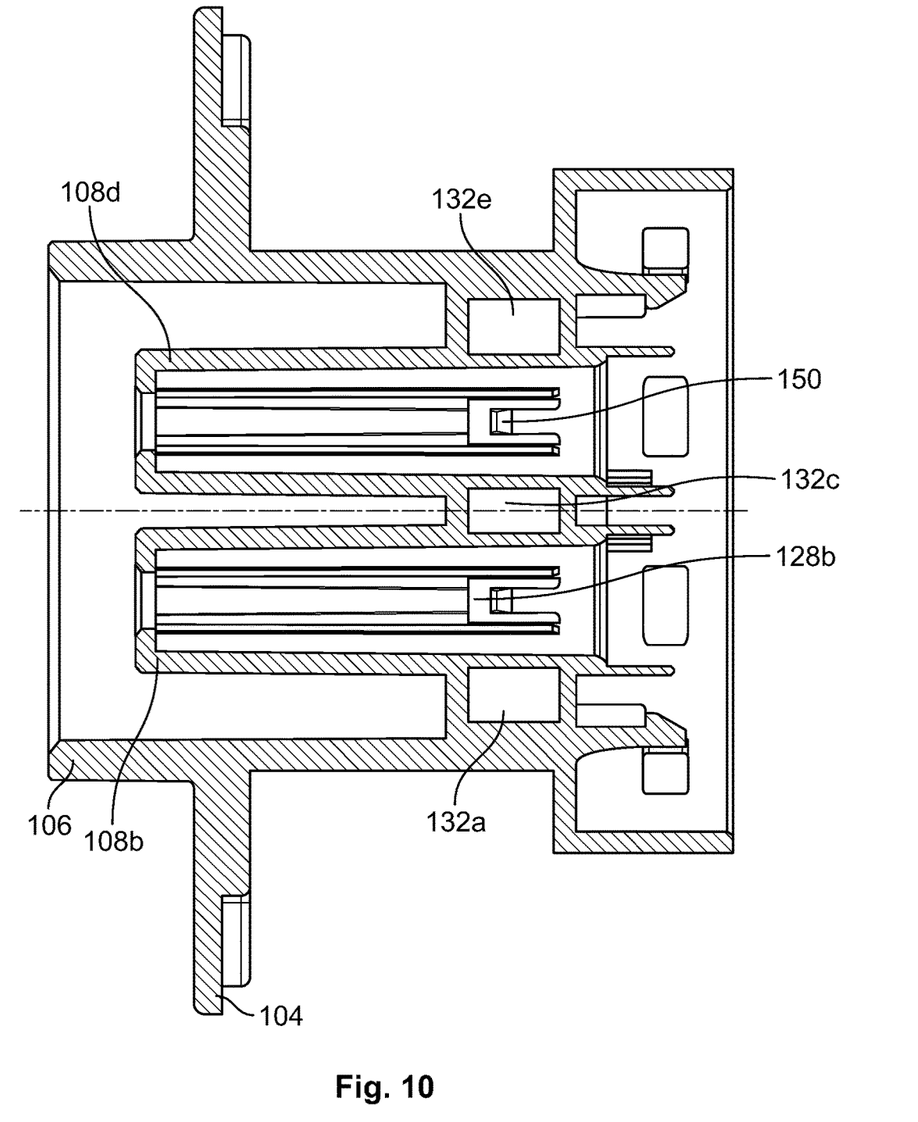
FIG. 10 is a sectional view taken along line X-X of FIG. 5.
Figure 11:
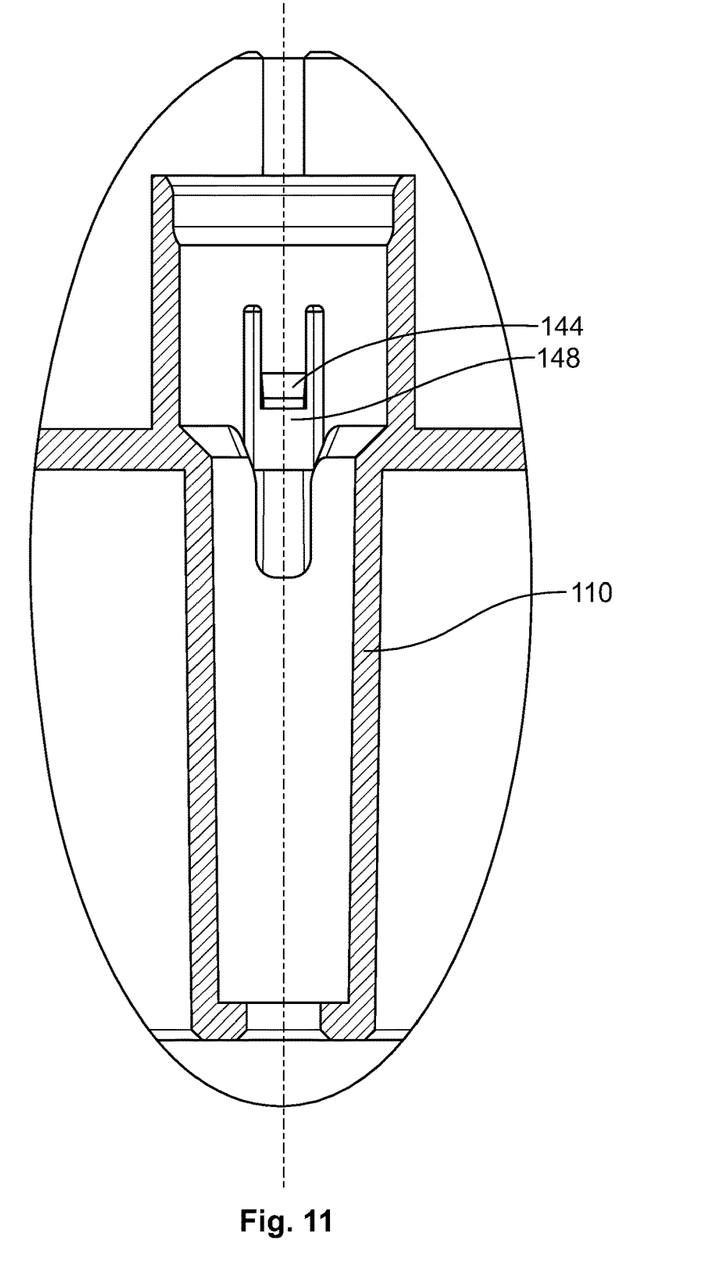
FIG. 11 is a detail view of region XI of FIG. 9.

Each of the signal contact chambers 110 also has a drainage opening 144, as shown in FIGS. 4 and 7, which connects with the insertion socket 106. In a similar manner to the drainage opening 128 in the power contact chambers 108 above, the drainage opening 144 is also used on the signal contact chambers 110 for forming a catch arm 146, as shown in FIG. 9. The catch arm 146 engages the signal contact element 113, which is generally produced from metal and received in the signal contact chamber 110. In the embodiment shown, the signal contact elements 113 are constructed as socket contacts, however, the present invention is not limited only to socket contacts; pin contacts can naturally also be used for a plug type connector 100 according to the invention.

Figure 3:
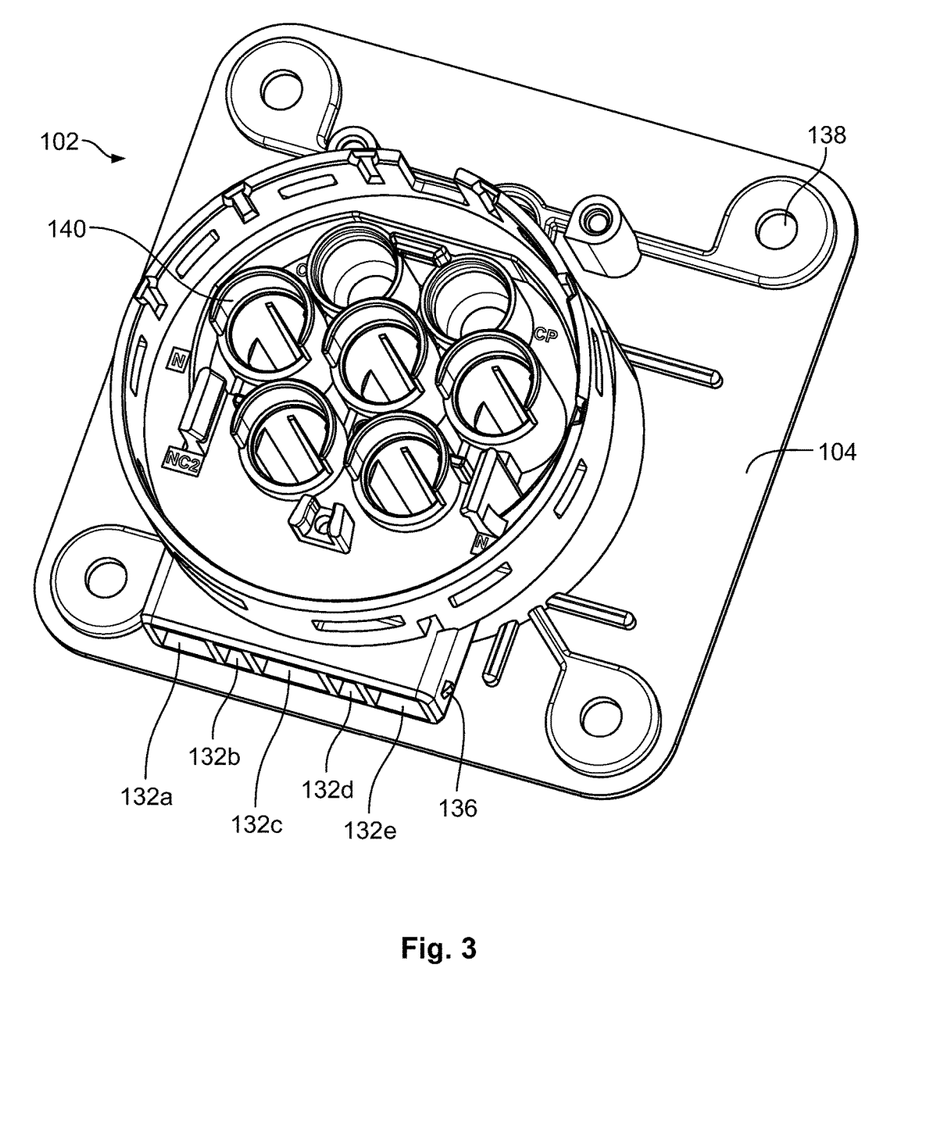
FIG. 3 is a perspective view of the housing of FIG. 2.

As shown in FIG. 3, on the side of the housing 102 facing the vehicle inner space, all contact chambers 108, 110 are surrounded by a collar 140 which is not completely peripheral. This collar 140 serves to fix the locking device 120 in the secured state.

A cable guide 124 and a cable cover 126 connected to the cable guide 124, shown in FIG. 1, protect the outgoing cables (not illustrated in the drawings) in the assembled state.

Figure 6:
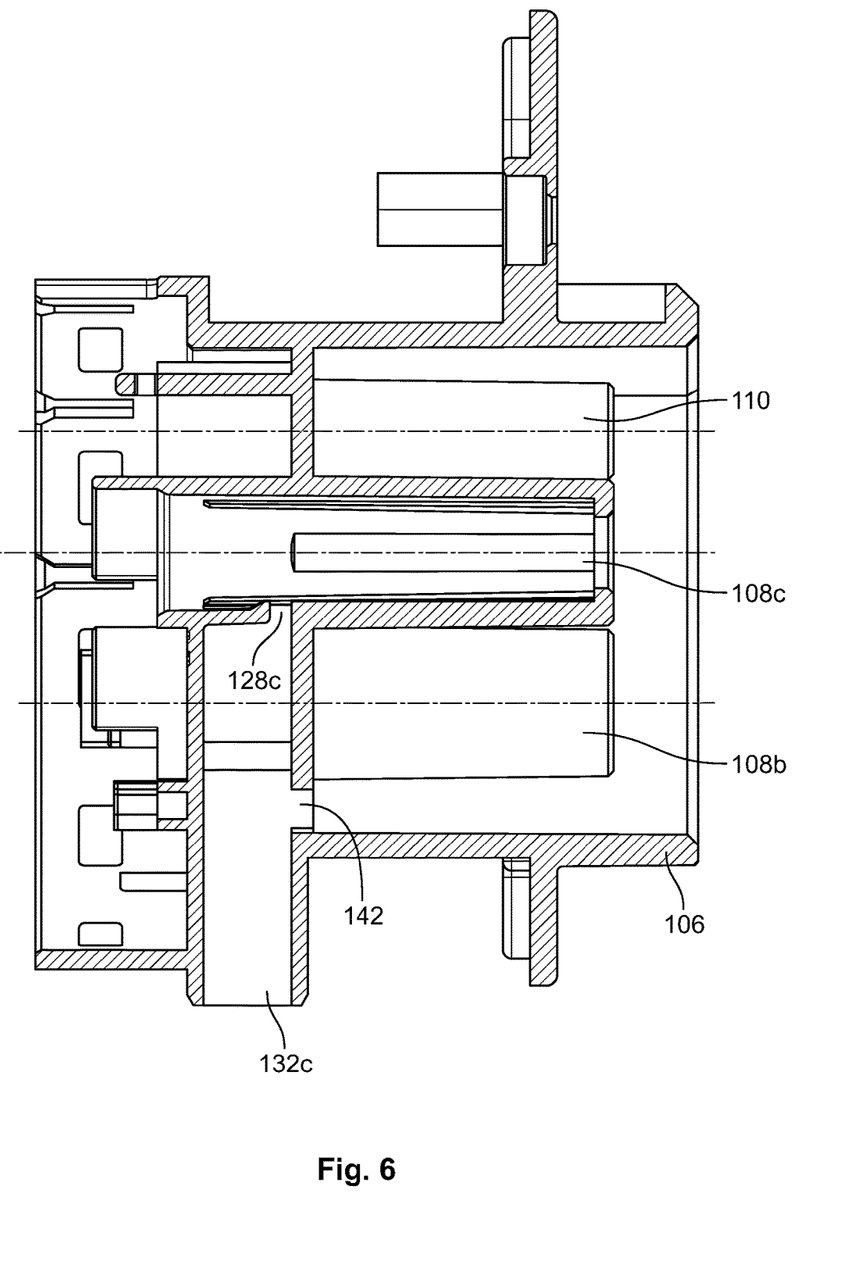
FIG. 6 is a sectional view taken along line VI-VI of FIG. 4.

Drainage opening 142 is provided in insertion socket 106, as shown in FIG. 4. As can be seen from the sectioned illustration in FIG. 6, the drainage opening 142 is fluidly connected to the central drainage channel 132c.

The slightly oblique position of the housing 102 shown in FIG. 2, in which the opening of the insertion socket 106 is higher than the rear base region, substantially corresponds to the installation orientation of the charging socket 100 in the motor vehicle. It is therefore clear that water also has to be removed from the insertion socket 106. This discharge of water is described in greater detail below.

Fluids, i.e. gas or liquids, which have entered a power contact chamber 108 can be discharged through a drainage opening 128. Each of the drainage channels 132 which correspond to the drainage openings 128 lead into the discharge connection pieces 134, which in turn lead the fluid, for example, to a hose. The discharge connection pieces 134 may be secured the charging socket 100 via the catch projections 136.

Fluids are removed from the signal contact chambers 110 via the drainage openings 144 into the insertion socket 106. Since the signal contact drainage openings 144 are arranged above the drainage opening 142 of the insertion socket under conventional installation conditions, the fluid which is discharged at this location flows down to the drainage opening 142, from where it can flow into the channel 132c and from there into the discharge connection piece 134. As can be seen from the contact designations of FIG. 5, the contact which is arranged in the central contact chamber 108c is connected to earth and is therefore most suitable for connecting the drainage of the insertion socket 106 to the drainage channel 132c which is associated therewith.

When the creep paths are taken into account, it can be seen that, as a result of the connection which is produced via the drainage opening 142, the spacing between the drainage opening 128c and the insertion-side inlet of the contact chamber 108b is sufficiently long. Using the solution according to the invention, it is thus advantageously possible to construct a charging socket for a motor vehicle in such a manner that all requirements with respect to creep current paths and air paths can be complied with even in the presence of significant occurrences of contamination or the influence of salt-containing water spray. Owing to this specific closed production method, the creep path between two contact elements with different potential may be twice the contact chamber length at the front side and twice the drainage channel length at the rear side. Values in the region of 60 mm can be readily achieved. The production is cost-effective with high batch numbers and the assembly and mounting are precise and simple.

What is claimed is:

1. An electrical plug type connector, comprising:
    an electrically insulating housing having an insertion socket;
    a plurality of first contact chambers disposed in the housing within the insertion socket, each first contact chamber having a first drainage opening;
    a plurality of power contact elements which are each received in one of the plurality of first contact chambers;
    a plurality of separate drainage channels integrally formed in the housing and extending perpendicularly to the plurality of first contact chambers, each drainage channel fluidly connected to the first drainage opening of one of the plurality of first contact chambers and extending separately to an exterior of the insertion socket;
    at least one second contact chamber disposed in the housing within the insertion socket, the insertion socket having a second drainage opening in an area surrounding the plurality of first contact chambers and the plurality of second contact chambers and fluidly connected to one of the drainage channels, each of the at least one second contact chambers has a third drainage opening fluidly connected with the insertion socket and fluidly connected to only the one drainage channel via the area surrounding the plurality of first contact chambers and the plurality of second contact chambers and the second drainage opening; and at least one signal contact element received in the at least one second contact chamber.

2. The electrical plug type connector of claim 1, wherein the housing has an assembly plate, the insertion socket protruding at least partially from the assembly plate.

3. The electrical plug type connector of claim 2, wherein the second drainage opening is disposed in an end region of the insertion socket adjacent to the assembly plate.

4. The electrical plug type connector of claim 1, wherein the plurality of first contact chambers each have a catch engaging the power contact element received therein.

5. The electrical plug type connector of claim 1, further comprising at least one O-ring disposed between each power contact element and the respective contact chamber.

6. The electrical plug type connector of claim 1, further comprising a locking device fixing the plurality of power contact elements to the housing.

7. The electrical plug type connector of claim 6, wherein the locking device is moveable in a direction transverse to a direction of the plurality of power contact elements.

8. The electrical plug type connector of claim 1, further comprising a discharge connection piece fluidly connected to the plurality of drainage channels.

9. The electrical plug type connector of claim 8, wherein the discharge connection piece fluidly connects the plurality of drainage channels to a hose.

10. The electrical plug type connector of claim 1, further comprising a cover disposed over electrical lines connected to the plurality of power contacts.

11. The electrical plug type connector of claim 1, wherein the plurality of power contact elements are socket contacts.

12. The electrical plug type connector of claim 1, wherein the housing is an injection-moulded plastic component.

13. The electrical plug type connector of claim 1, wherein the first drainage opening is disposed adjacent a rear of each first contact chamber.

14. A charging socket for an electric or hybrid vehicle, comprising:
an electrical plug type connector having
an electrically insulating housing having an insertion socket,
a plurality of first contact chambers disposed in the housing within the insertion socket, each first contact chamber having a first drainage opening,
a plurality of power contact elements which are each received in one of the plurality of first contact chambers,
a plurality of separate drainage channels integrally formed in the housing and extending perpendicularly to the plurality of first contact chambers, each drainage channel fluidly connected to the first drainage opening of one of the plurality of first contact chambers and extending separately to an exterior of the insertion socket,
at least one second contact chamber disposed in the housing within the insertion socket, the insertion socket having a second drainage opening in an area surrounding the plurality of first contact chambers and the plurality of second contact chambers and fluidly connected to one of the drainage channels, each of the at least one second contact chambers has a third drainage opening fluidly connected with the insertion socket and fluidly connected to only the one drainage channel via the area surrounding the plurality of first contact chambers and the plurality of second contact chambers and the second drainage opening, and
at least one signal contact element received in the at least one second contact chamber.

15. An electrical plug connection assembly, comprising:
an electrical plug type connector having
an electrically insulating housing having an insertion socket,
a plurality of first contact chambers disposed in the housing within the insertion socket, each first contact chamber having a first drainage opening,
a plurality of power contact elements which are each received in one of the plurality of first contact chambers,
a plurality of separate drainage channels integrally formed in the housing and extending perpendicularly to the plurality of first contact chambers, each drainage channel fluidly connected to the first drainage opening of one of the plurality of first contact chambers and extending separately to an exterior of the insertion socket,
at least one second contact chamber disposed in the housing within the insertion socket, the insertion socket having a second drainage opening in an area surrounding the plurality of first contact chambers and the plurality of second contact chambers and fluidly connected to one of the drainage channels, each of the at least one second contact chambers has a third drainage opening fluidly connected with the insertion socket and fluidly connected to only the one drainage channel via the area surrounding the plurality of first contact chambers and the plurality of second contact chambers and the second drainage opening, and
at least one signal contact element received in the at least one second contact chamber; and
an associated mating connector.

* * * * *